(12) United States Patent
Jain et al.

(10) Patent No.: US 12,717,958 B2
(45) **Date of Patent: *Aug. 25, 2026**

(54) IMPLEMENTING INHERITED GRANTS USING SECURE SCHEMAS

(71) Applicant: Snowflake Inc., Bozeman, MT (US)

(72) Inventors: Vikas Jain, Fremont, CA (US); Eric Karlson, Alameda, CA (US); Sepideh Khoshnood, Issaquah, WA (US)

(73) Assignee: SNOWFLAKE INC., Menlo Park, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 18/885,431

(22) Filed: Sep. 13, 2024

(65) Prior Publication Data

US 2025/0005192 A1 Jan. 2, 2025

Related U.S. Application Data

(63) Continuation of application No. 18/805,286, filed on Aug. 14, 2024, which is a continuation of application (Continued)

(51) Int. Cl.

*G06F 21/60* (2013.01)
*G06F 21/62* (2013.01)
*H04L 9/40* (2022.01)

(52) U.S. Cl.

CPC ........ *G06F 21/6227* (2013.01); *G06F 21/604* (2013.01); *G06F 21/6218* (2013.01); (Continued)

(58) Field of Classification Search

CPC ............... G06F 21/6227; G06F 21/604; G06F 21/6218; G06F 21/62; G06F 21/60; (Continued)

(56) References Cited

U.S. PATENT DOCUMENTS

| | | | | |
|---|---|---|---|---|
| 7,484,245 B1 | 1/2009 | Friedman et al. | | |
| 7,865,959 B1 * | 1/2011 | Lewis | G06F 21/6218 726/17 | |

(Continued)

FOREIGN PATENT DOCUMENTS

| | | |
|---|---|---|
| WO | 2011122366 A1 | 10/2011 |
| WO | 2021107994 A1 | 6/2021 |

OTHER PUBLICATIONS

"What Is Role-Based Access Control (RBAC)? A Complete Guide"—Front Egg, Mar. 15, 2022, 9 pages, https://frontegg.com/guides/rbac.

(Continued)

*Primary Examiner* — Jayesh M Jhaveri
(74) *Attorney, Agent, or Firm* — SCHWEGMAN LUNDBERG & WOESSNER, P.A.

(57) ABSTRACT

Embodiments of the present disclosure provide systems and methods for using secure schemas to address inconsistencies between standard RBAC rules and the use of inherited grants. A secure schema may be defined that transfers ownership of an object created in the secure schema to a role that owns the secure schema. An inherited grant may be attached to the secure schema, where the inherited grant specifies a permission on a first type of object in the secure schema and a grant of the permission to the role that owns the secure schema. When objects are created in the secure schema, ownership of each of the set of objects is transferred to the role that owns the secure schema to authorize the role that owns the secure schema to manage grants to the set of objects on the secure schema.

30 Claims, 8 Drawing Sheets

Related U.S. Application Data

No. 18/228,546, filed on Jul. 31, 2023, now Pat. No. 12,124,602, which is a continuation of application No. 18/227,818, filed on Jul. 28, 2023, now Pat. No. 12,105,828.

(60) Provisional application No. 63/427,723, filed on Nov. 23, 2022.

(52) U.S. Cl.
CPC ............ *H04L 63/10* (2013.01); *H04L 63/102* (2013.01); *H04L 63/105* (2013.01); *H04L 63/101* (2013.01); *H04L 63/104* (2013.01); *H04L 63/107* (2013.01)

(58) Field of Classification Search
CPC ..... H04L 63/10; H04L 63/102; H04L 63/105; H04L 63/101; H04L 63/104; H04L 63/107; H04L 9/40
See application file for complete search history.

(56) References Cited

U.S. PATENT DOCUMENTS 8,190,673 B2 5/2012 Junghans et al.
8,402,514 B1 3/2013 Thompson et al.
8,813,250 B2 8/2014 Morita
9,516,028 B1 12/2016 Andruschuk et al.
10,540,508 B2 1/2020 Byun et al.
11,188,670 B2 11/2021 Langseth et al.
11,768,810 B2 * 9/2023 Jassal .................... H04L 63/101 707/785
11,809,586 B2 11/2023 Carru et al.
2004/0199765 A1 10/2004 Kohane et al.
2006/0282433 A1 12/2006 Dutta et al.
2007/0233709 A1 10/2007 Abnous et al.
2008/0016580 A1 1/2008 Dixit et al.
2008/0208924 A1 * 8/2008 Bradshaw ............... G06F 9/455
2013/0047098 A1 * 2/2013 Shuster ................. H04L 67/131 715/757
2013/0125233 A1 5/2013 Bush et al.
2013/0159021 A1 6/2013 Felsher
2014/0143857 A1 * 5/2014 Maim ................... G06F 16/958 726/17
2014/0304836 A1 10/2014 Velamoor et al.
2015/0101042 A1 4/2015 Yang
2017/0249472 A1 8/2017 Levy et al.
2018/0247069 A1 * 8/2018 Tang ................... G06F 21/6218
2020/0311297 A1 10/2020 Langseth et al.
2021/0288972 A1 * 9/2021 Koch ...................... H04L 63/20

OTHER PUBLICATIONS

"How to Design a Hierarchical Role Based Access Control System"—Stack Overflow, Apr. 2013, 19 pages, https://stackoverflow.com/questions/16139712/how-to-design-a-hierarchical-role-based-access-control-system.

* cited by examiner

IMPLEMENTING INHERITED GRANTS USING SECURE SCHEMAS

CROSS-REFERENCE TO RELATED APPLICATIONS

This application is a continuation of U.S. patent application Ser. No. 18/805,286 filed Aug. 14, 2024 and entitled "GRANT INHERITANCE IN RBAC," which is a continuation of U.S. patent application Ser. No. 18/228,546 filed Jul. 31, 2023 and entitled "IMPLEMENTING INHERITED GRANTS USING SECURE SCHEMAS," which is a continuation of U.S. patent application Ser. No. 18/227,818 filed Jul. 28, 2023 and entitled "GRANT INHERITANCE IN RBAC," which claims priority to U.S. Provisional Application No. 63/427,723, filed Nov. 23, 2022, and entitled "GRANT INHERITANCE IN RBAC," the disclosures of which are hereby incorporated by reference.

TECHNICAL FIELD

The present disclosure relates to data sharing platforms, and particularly to using inherited grants to grant privileges to objects in a container in a role-based access control (RBAC) framework.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
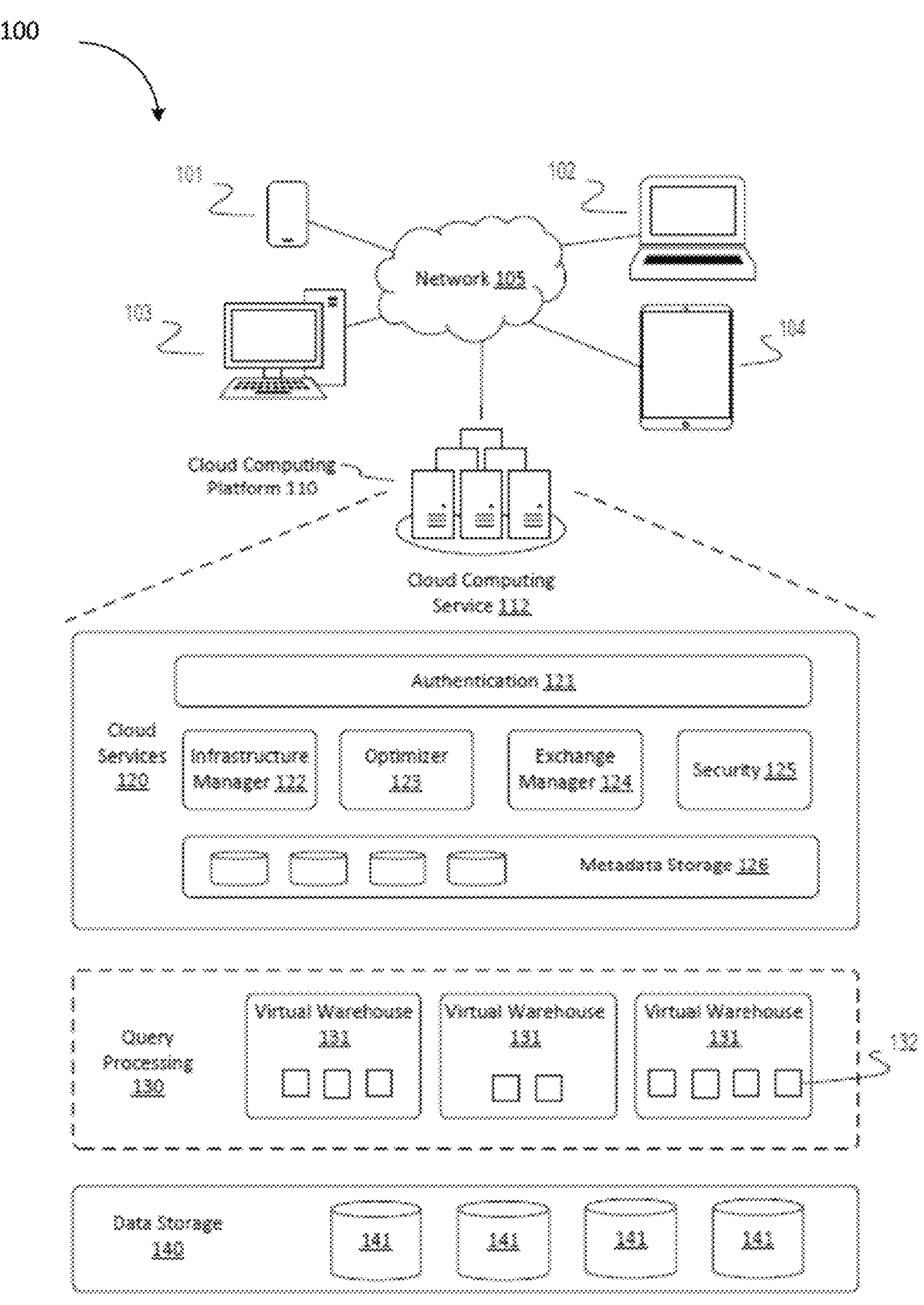
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as SNOWFLAKE™, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "Snowflake data marketplace," or a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control (RBAC) to govern access to objects within consumer accounts using account level roles and grants. Account level roles are special objects in a consumer account that are assigned to users, and grants between an account level role and database objects define what privileges the account level role has on these objects. The account level roles of a user include a special role called e.g. "PUBLIC" which every user is granted, and some number of additional user-created roles. For example, a role that has a usage grant on a database can "see" the database when executing the command "show databases," while a role that has a select grant on a table can read from the table but not write to the table. The role would need to have a modify grant on the table to be able to write to it. These roles exist in a hierarchy where certain roles dominate others. Granting one role to another role creates the role hierarchy and determines which roles dominate which other roles (e.g., a first role dominates a second role that is granted to it). A permission may comprise a privilege which applies to an object, such as SELECT (privilege) on a particular TABLE (object). Permissions are granted to roles and every role inherits all permissions granted directly to itself and those granted to any role that it (recursively) dominates.

However, when a customer creates large numbers of objects (e.g., millions of objects) in an account, this in turn results in the creation of a large number of grants that must be managed. The scale of the grants created along with complex role hierarchies can place a significant amount of stress on a data exchange. Because RBAC evaluation is performed at query compilation time, and if there are hundreds of thousands of grants to be evaluated, the compilation time increases and may cause timeouts leading to compilation failures. This causes user experience issues as well as potential lost revenue as the user may not retry the query.

A future grant is a type of grant that can be attached to a container (e.g., a schema or a database) and defines grants on future objects of a specified type within the container. For example, a user may apply a future grant to a schema X by using the command "GRANT SELECT on FUTURE TABLES in schema X to ROLE Y." Thus, when a table is created in schema X, the SELECT privilege will be granted to it automatically. Although future grants can facilitate all objects of a certain type in a given container having the same grant of privileges (also referred to herein as an "authorization profile"), future grants still result in the creation of individual grants for each newly created object leading to massive grant proliferation.

In addition, the query engine of a data exchange may utilize caching logic to cache grant metadata which includes the grants themselves. However, the access patterns for this metadata exhibit very low locality of reference since grants are associated with discrete objects and repeated access to the same object is uncommon in a multi-tenant database system with large numbers of discrete objects for each account. The poor locality of reference combined with the cost of retrieving these huge grant metadata sets results in poor compilation performance and an increased load on the metadata storage of the data exchange.

Further, many customers want that all objects in a given schema have a consistent authorization profile. This is evidenced by future grants adoption metrics.

Embodiments of the present disclosure address the above noted and other problems by introducing an inherited grant. An inherited grant is a specification of a privilege that is granted to all objects of a particular type (such as tables) in a particular container (e.g. a database or a schema). Once an inherited grant is attached to a container, the applicable objects residing within that container will inherit those privileges. Unlike future grants, object-level grants are not materialized when new objects are created in the container. Instead, when an object in the container is referenced, an authorization check is performed and an implied grant is created in-memory based on the relevant inherited grants that are attached to the container at the time of the authorization check.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
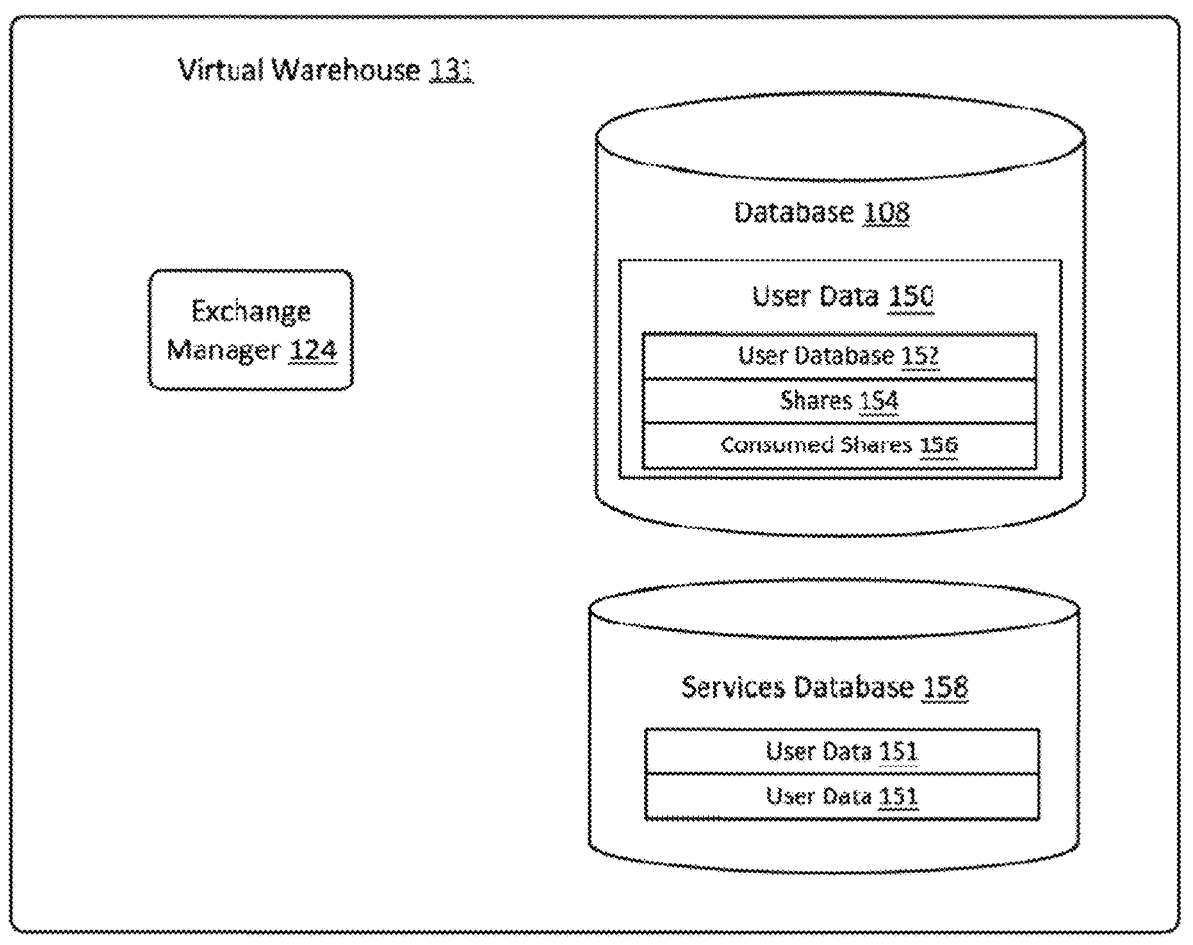
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
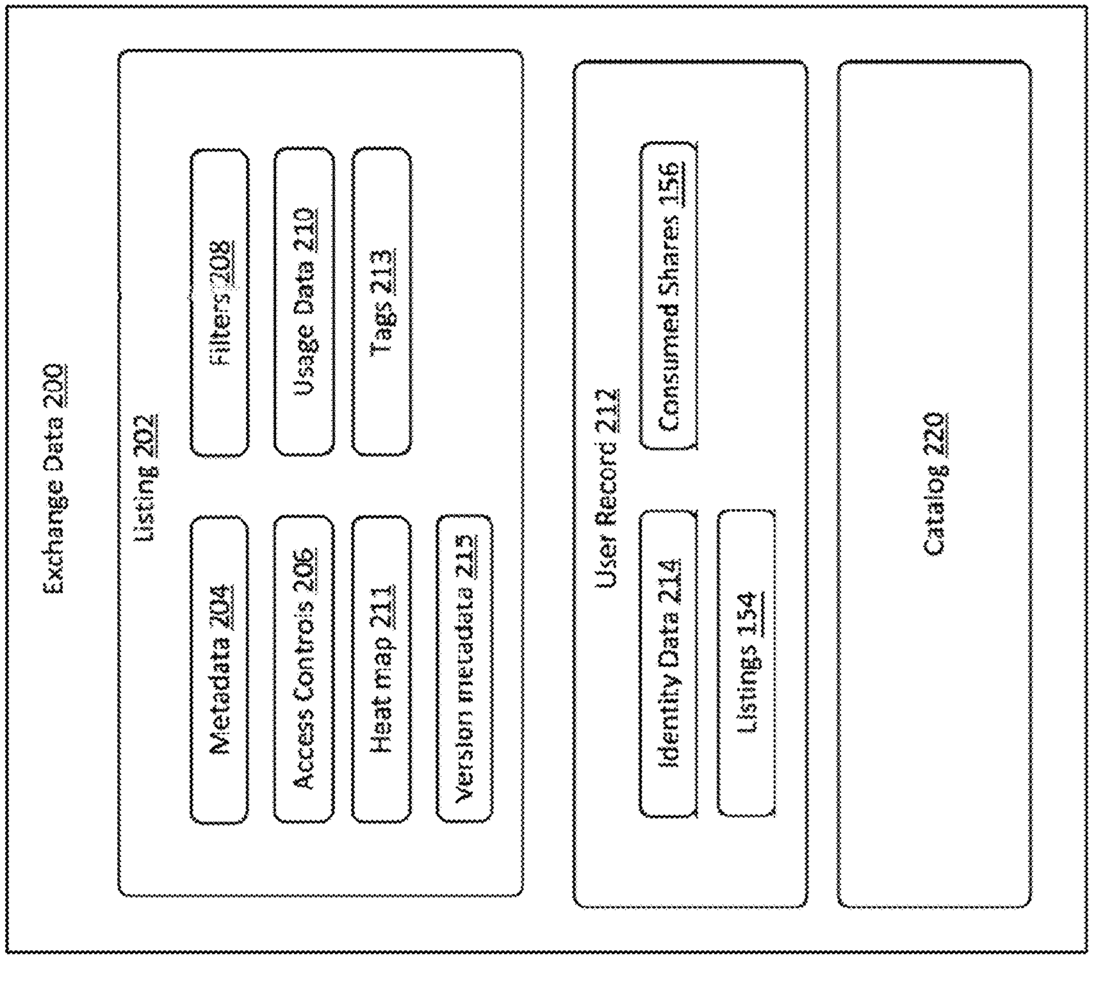
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Figure 4:
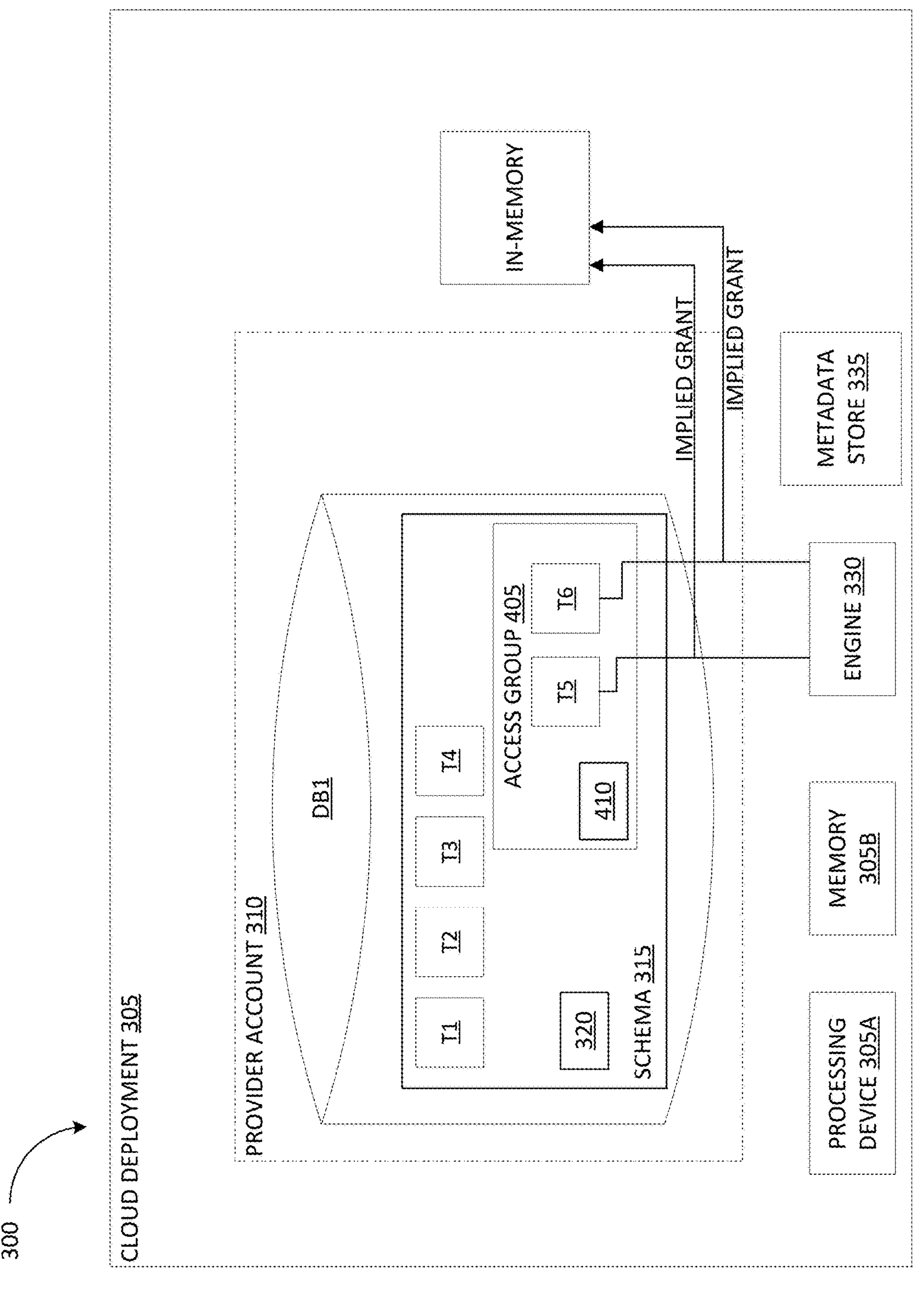
FIG. 4 is a schematic block diagram of a cloud deployment using access groups and inherited grants to grant privileges to objects in a container, in accordance with some embodiments of the present invention.
Figure 6:
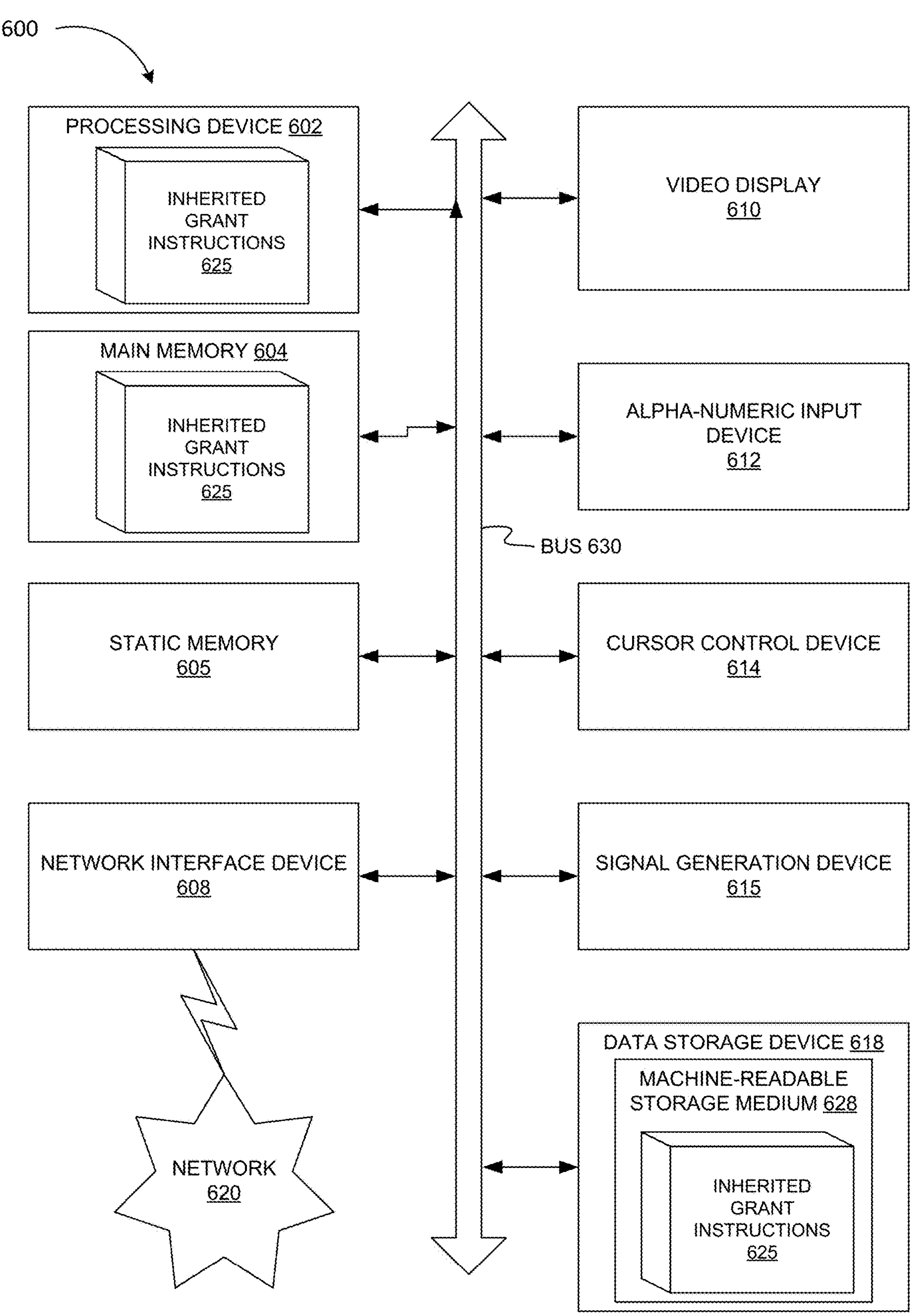
FIG. 6 is a block diagram of an example computing device that may perform one or more of the operations described herein, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 158 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing (i.e., dataset) can help solve one or more use cases, and hence may be applicable to multiple use cases.

Because use case information relates to how data is used, it can be a powerful tool for organizing/searching for data listings as it allows consumers of the data marketplace to explore and find datasets and services based on industry problems they're trying to solve (e.g., supply chain optimization, audience segmentation). However, providers often describe use cases for data listings in an unstructured format, making it hard for consumers to find them. Because there is no standardized representation for such use case information, it is difficult to create data listing filters based on use case information.

Embodiments of the present disclosure solve the above and other problems by enabling providers to assign use case data to data listings in a structured manner, thereby allowing for data listings to be organized and searched/filtered based on use case information in a more effective manner. A processing device may be used to assign to a first data listing, a set of use cases from a plurality of use cases, each of the set of use cases indicating a manner in which data of the first data listing is used. In order to perform this assigning, the processing device may provide a listing creation interface having selectable indications of each of the plurality of use cases and may receive, via the listing creation interface, a selection of the set of use cases assigned to the first data listing (e.g., from the consumer). The first data listing may be published on the data exchange, wherein the first data listing is one of a plurality of data listings published on the data exchange and the processing device may provide a data listing interface comprising a graphical representation of each of the plurality of data listings; and an interactable menu including a selectable indication of each of the plurality of use cases. In response to receiving a selection of one or more of the plurality of use cases via the interactable menu, the processing device may display in the data listing interface, a graphical representation of each of the plurality of data listings that have been assigned any of the selected one or more use cases. The embodiments described herein make it easy for consumers to browse the data exchange based on their business needs in order to find listings that solve those needs. Embodiments of the present disclosure also enable a data exchange operator to learn about consumers' business needs based on their browsing patterns and querying activities (individual and collective), and further personalize their overall data exchange experience (listing recommendations on worksheets, etc.). It should be noted that a "business need" and a "use case" are used interchangeably herein.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3A:
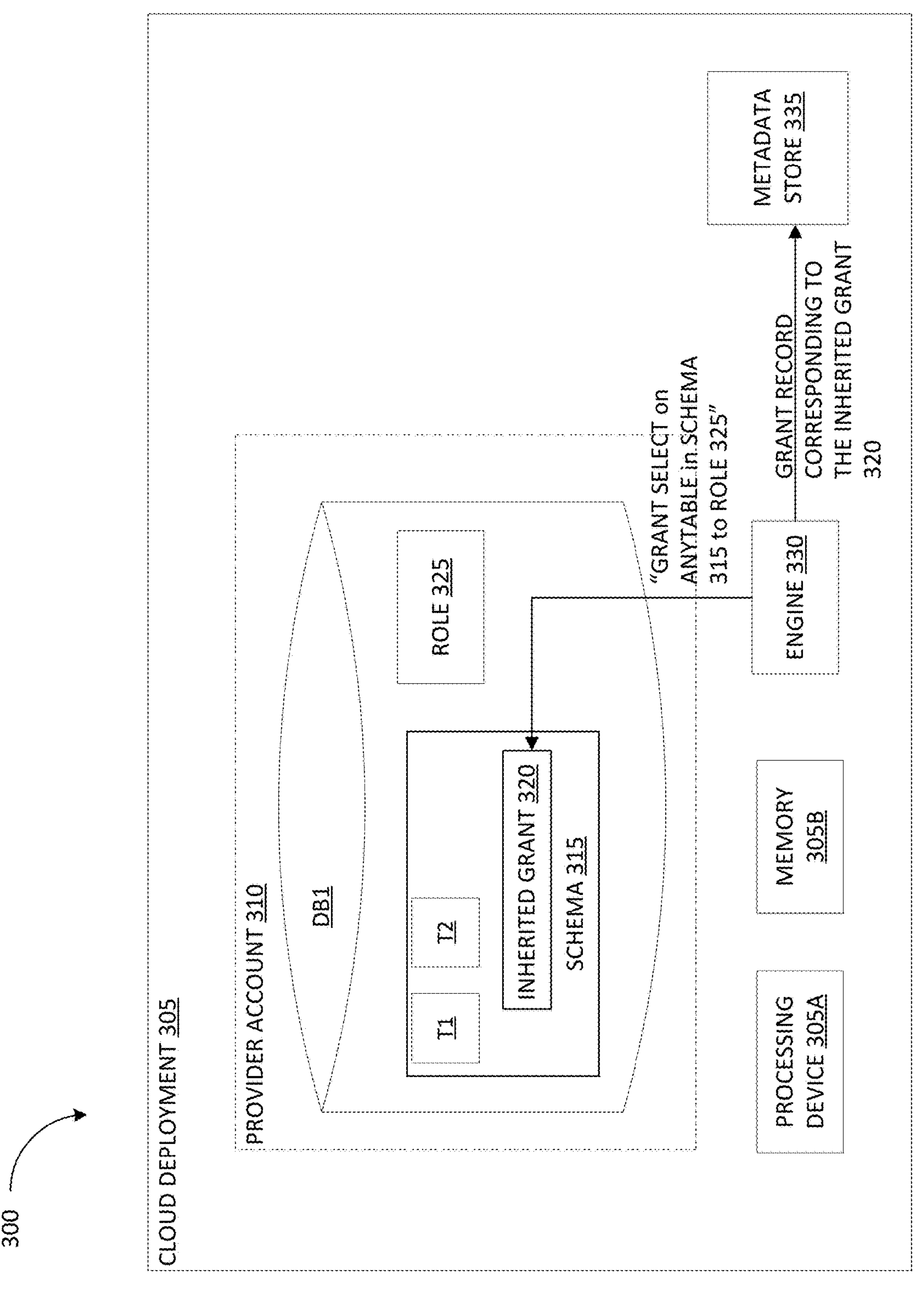
FIGS. 3A and 3B are schematic block diagrams of a cloud deployment implementing techniques for using inherited grants to grant privileges to objects in a container, in accordance with some embodiments of the present invention.

FIG. 3A illustrates a cloud environment 300 comprising a cloud deployment 305, which may comprise a similar architecture to cloud computing service 112 (illustrated in FIG. 1A) and may be a deployment of a data exchange or data marketplace. Although illustrated with a single cloud deployment, the cloud environment 300 may have multiple cloud deployments which may be physically located in separate remote geographical regions but may all be deployments of a single data exchange or data marketplace. The cloud deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 305 may comprise any suitable type of computing device or machine that has a programmable processor including, for example, server computers, desktop computers, laptop computers, tablet computers, smartphones, set-top boxes, etc. In some examples, the cloud deployment 305 may comprise a single machine or may include multiple interconnected machines (e.g., multiple servers configured in a cluster).

Containers such as databases and schemas may be used to organize data stored in the cloud deployment 305 and each database may belong to a single account within the cloud deployment 305. Each database may be thought of as a container having a classic folder hierarchy within it. Each database may be a logical grouping of schemas and a schema may be a logical grouping of database objects (tables, views, etc.). Each schema may belong to a single database. In the example of FIG. 3A, the provider account 310 may include a database DB1, which includes a schema 315. The schema 315 may in turn include tables T1 and T2. The cloud deployment 305 may utilize any appropriate metadata store 335 such as FoundationDB, for example, to store the grant metadata of schema 315 and any other schemas within database DB1. FIG. 3A also illustrates a query engine 330, which may function to perform the query processing, object discovery, RBAC, and other functions of the cloud deployment 305.

FIG. 3A also illustrates an inherited grant 320. An inherited grant is a specification of a privilege that should be granted to all objects of a particular type (e.g., tables) in a particular container (e.g., a database or a schema). The inherited grant may be attached to a container and the objects of the particular type specified in the inherited grant that reside within the container will inherit those privilege grants. In the example of FIG. 3A, the inherited grant 320 may be created by the query engine 330 and attached to the schema 315. In the example of FIG. 3A, the inherited grant 320 may specify that the select privilege be granted for all tables in the container schema 315 to role 325 (e.g., "GRANT SELECT on ANYTABLE in SCHEMA 315 to ROLE 325").

As shown in FIG. 3A, when the query engine 330 attaches the inherited grant 320 to the schema 315, it may persist a single grant record corresponding to the inherited grant 320 in an entry (not shown) of the metadata store 335 that is associated with schema 315. When the inherited grant 320 is attached to the schema 315, the inherited grant 320 immediately applies to all objects currently in the schema 315 of the type indicated in the inherited grant 320. In the example of FIG. 3A, when the inherited grant 320 is attached to the schema 315, the inherited grant 320 is immediately materialized in the metadata store 335, while implied grants for tables T1 and T2 are materialized when the respective table is referenced (e.g., during an authorization check performed as part of the query engine 330 compiling an SQL statement that references the respective table) and are materialized in-memory, as discussed in further detail herein. Similarly, removing the inherited grant 320 from the schema 315 would result in the revocation of any implied grants (and thus immediate removal of the associated privilege) from tables T1 and T2. An implied grant is a transient grant that exists only during the authorization phase of compiling an SQL statement (or statement in any appropriate query language) that references the object the transient grant applies to.

Figure 3B:
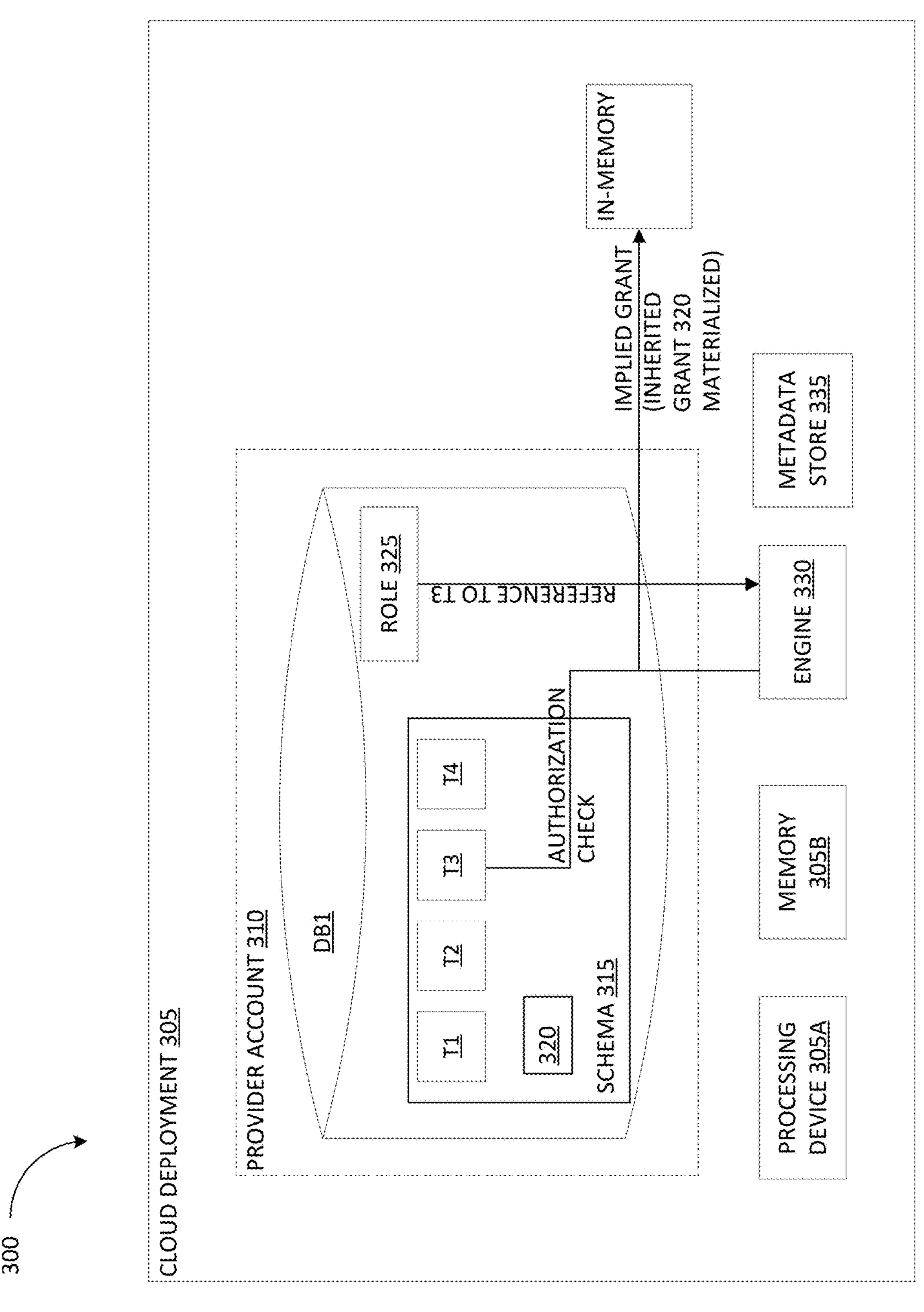

Referring to FIG. 3B, the query engine 330 may create tables T3 and T4. Unlike future grants, when using the inherited grant 320, the query engine 330 may not materialize object-level grants when the new tables T3 and T4 are created in the schema 315. Stated differently, when tables T3 and T4 are created in the schema 315, no object-level grant record is created and stored in metadata store 335. Instead, the query engine 330 may create implied grants virtually/in-memory when the tables T3 and T4 are referenced. In the example of FIG. 3B, the role 325 may attempt to utilize the select privilege on table T3 and in response the query engine 330 may perform an authorization check to ensure that role 325 has the correct permissions to utilize the select privilege on table T3. As part of this authorization check, the query engine 330 may locate (e.g., by reading from the metadata store 335) any grants that are directly attached to the table T3 as well as any grants that are directly attached to the schema 315. The query engine 330 may determine that the inherited grant 320 has been persisted on the schema 315 and that the inherited grant 320 specifies that the select privilege should be granted for any table in the schema 315 to role 325. The query engine 330 may read the inherited grant 320 and create an implied grant virtually (i.e., in-memory). The implied grant is transient and only exists in-memory for the purpose of the authorization check. In this way, the inherited grant 320 is materialized when the role 325 utilizes the select privilege on table T3 (i.e., the table T3 is referenced). Using the implied grant, the query engine 330 may determine that the role 325 is authorized to utilize the select privilege on any table in the schema 315.

As can be seen, in situations involving numerous objects of various types created in the schema 315, inherited grants can be used to ensure there is far less grant metadata stored into the metadata store 335 (as long as access patterns are consistent). This is because any objects in the schema 315 that have the same privilege granted on them would be realized by a single inherited grant instead of multiple object-level grants. The inherited grant 320 on the schema 315 can be reused more often since anytime a table is created in the schema 315, the query engine 330 will utilize the inherited grant 320. Inherited grants allow the owner of a container to define a consistent authorization profile for all objects of a particular type in the container, so that all objects of the particular type in the container will exhibit the same set of implied privilege grants. In addition, any change to an inherited grant attached to a container will immediately impact all associated objects in that container.

The use of inherited grants also results in improved cache performance due to improved locality-of-reference. Typical customers have a database/schema, and then multiple objects within the schema. Objects of the same type (e.g., tables) in the schema 315 are often related and if a user runs a query against a first table in the schema 315, there is a high likelihood that they will query other tables in the schema 315. The tendency to put related tables in the same schema means that multiple queries will access tables in same schema even if it is not the same tables each time. This means that there is repeated access to the same schema. Based on this, it follows that any authorization check on an object in the schema 315 would make shared use of a common set of inherited grants instead of disparate sets of object-level grants.

Although illustrated with respect to the select privilege, inherited grants can be used to grant any privilege including e.g. the insert and modify privileges among others (e.g., "GRANT INSERT on ANYTABLE in SCHEMA 315 to ROLE 325). Inherited grants can also be used to grant permissions on various different types of objects including tables, views, functions, and native applications, among others (e.g., "GRANT INSERT on ANYFUNCTION in SCHEMA 315 to ROLE 325"). In addition, inherited grants are grantable to all types of roles including e.g., account roles, database roles, and bundle roles. Inherited grants can also be applied in various types of schemas including e.g., regular schemas and managed access schemas.

There may be scenarios where a user wishes to create objects in a container that has an inherited grant (that would apply to those objects being created) attached to it, but does not want the inherited grant to apply to the objects. Thus, in some embodiments, the user may define one or more access groups to which objects can be associated. An access group may be a top-level account object to which inherited grants may be attached. The user may then mark (or tag) objects as being part of a given access group, and only objects that are tagged as part of an access group will assume that access group's inherited grants when they are referenced. FIG. 4 illustrates the cloud deployment 305 in an embodiment where an access group 405 is being used to control which objects assume an inherited grant 410. The query engine 330 may create access group 405, and attach inherited grant 410 to the access group 405. The inherited grant 410 may specify an insert privilege on any table in schema 315 to role 325 (e.g., "GRANT INSERT on ANYTABLE in SCHEMA 315 to ROLE 325). The query engine 330 may subsequently create tables T5 and T6, but a user may not wish for the insert privilege granted by inherited grant 410 to apply to tables T1-T4 (but does wish for the insert privilege granted by inherited grant 410 to apply to tables T5 and T6). Thus, the user may tag tables T5 and T6 as being part of access group 405.

There may also be scenarios where a user wishes to exclude certain objects in a container that has an inherited grant that would otherwise normally apply to those certain objects. Thus, in some embodiments, access groups may be used to exclude certain objects from an inherited grant. More specifically, when the user marks (or tags) objects as being part of a given access group, objects that are tagged as part of the given access group will be excluded from any inherited grants attached to the container when they are referenced.

Normally when an object is created, the role of the object creator is the owner of the object and has full control over the object (e.g., granting privileges on the object, altering the object). As a result, the use of inherited grants can result in an inconsistency with the standard RBAC rules since an object created in a schema is controlled by inherited grants of the schema. A managed schema is an exception to the standard RBAC rules where when an object is created in the managed schema, an owner of the object can alter the object and/or add certain data to the object, but is still restricted from granting privileges on the object. In this way the managed schema provides a limited set of rights to the owner of the object beyond what they normally have when the object is created in the schema. However, managed schemas are still not fully consistent with the use of inherited grants.

Thus, some embodiments of the present disclosure also provide for secure schemas to address this inconsistency between standard RBAC rules and the use of inherited grants. With a secure schema, when an object is created in a secure schema, ownership of the object itself transfers to the owner of the secure schema. As a result, the original owner's access to the object is now completely governed by whatever permissions the owner of the secure schema has put in place. Stated differently, inherited grants essentially give the owner of schema the ability to control access to the objects. The secure schema enables consistency with RBAC rules by allowing the owner of the schema to also be the owner of an object created in the schema (i.e., schema and object to be owned by the same role). In this way, there is no inconsistency when an object created in a schema is controlled by inherited grants of the schema. Because the schema and the object are owned by the same role, that role has authorization to manage grants on the schema. The role that owns the schema has to be granted (e.g., by an administrator of the cloud deployment 305) a special account level privilege to create inherited grants (i.e., manage grants on/access to the objects in the schema even though the role that owns the schema is not the owner of them).

In relational databases, if a user wishes to grant a privilege on an object to a role, they need the correct authorization on the object to perform the grant. However, no authorization on the role the privilege is being granted to is required. As a result, if users wish to manage their role hierarchies and assignment of permissions based on externally defined logic, this may break the cloud deployment 305's model. To prevent this, some embodiments of the present disclosure also provide for secure roles. A secure role is a role where the only user that can grant any privilege to the secure role, is the role that owns the secure role. Because the query engine 330 may have a particular privilege that allows them to create roles, in some embodiments it may create all roles as secure roles, and make all grants to these secure roles. Users cannot change any of the grants made to these secure roles because they don't own those secure roles. In this way, an administrator of the cloud deployment 305 can create a role hierarchy and grant roles to the roles in the hierarchy, while ensuring that users cannot change the established hierarchy.

Figure 5:
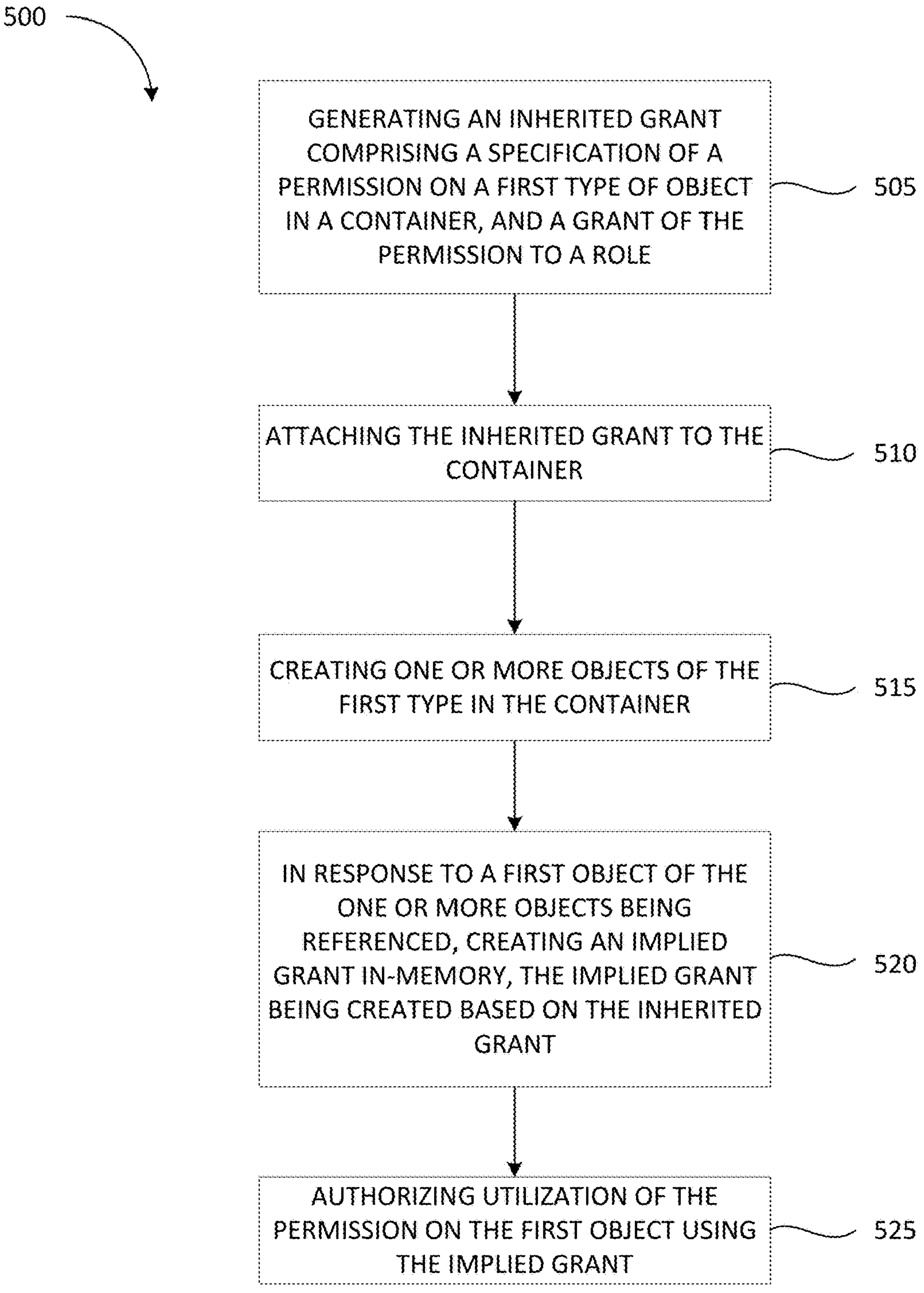
FIG. 5 is a flow diagram of a method for using inherited grants to grant privileges to objects in a container, in accordance with some embodiments of the present invention.

FIG. 5 is a flow diagram of a method 500 for using inherited grants to grant privileges to objects in a container, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a processing device of cloud deployment 305 (illustrated in FIGS. 3A, 3B, and 4).

Referring simultaneously to FIG. 3A, at block 505, the query engine 330 may create an inherited grant 320. An inherited grant is a specification of a privilege that should be granted to all objects of a particular type (e.g., tables) in a particular container (e.g., a database or a schema). The inherited grant may be attached to a container and the objects of the particular type specified in the inherited grant that reside within the container will inherit those privilege grants. In the example of FIG. 3A, the query engine 330 may create the inherited grant 320 and at block 510 may attach it to the schema 315. In the example of FIG. 3A, the inherited grant 320 may specify that the select privilege be granted for all tables in the container schema 315 to role 325 (e.g., "GRANT SELECT on ANYTABLE in SCHEMA 315 to ROLE 325").

As shown in FIG. 3A, when the query engine 330 attaches the inherited grant 320 to the schema 315, it may persist a single grant record corresponding to the inherited grant 320 in an entry (not shown) of the metadata store 335 that is associated with schema 315. When the inherited grant 320 is attached to the schema 315, the inherited grant 320 immediately applies to all objects currently in the schema 315 of the type indicated in the inherited grant 320. In the example of FIG. 3A, when the inherited grant 320 is attached to the schema 315, the inherited grant 320 is immediately materialized in the metadata store 335, while implied grants for tables T1 and T2 are immediately realized materialized when the respective table is referenced (e.g., during an authorization check performed as part of the query engine 330 compiling an SQL statement that references the respective table) and are materialized in-memory, as discussed in further detail herein. Similarly, removing the inherited grant 320 from the schema 315 would result in the revocation of any implied grants (and thus immediate removal of the associated privilege) from tables T1 and T2.

Referring to FIG. 3B, at block 515 the query engine 330 may create tables T3 and T4. Unlike future grants, when using the inherited grant 320, the query engine 330 may not materialize object-level grants when the new tables T3 and T4 are created in the schema 315. Stated differently, when tables T3 and T4 are created in the schema 315, no object-level grant record is created and stored in metadata store 335. Instead, the query engine 330 may create implied grants virtually/in-memory when the tables T3 and T4 are referenced. More specifically, at block 520, the role 325 may attempt to utilize the select privilege on table T3 (i.e., T3 may be referenced) and in response the query engine 330 may perform an authorization check to ensure that role 325 has the correct permissions to utilize the select privilege on table T3. As part of this authorization check, the query engine 330 may locate (e.g., by reading from the metadata store 335) any grants that are directly attached to the table T3 as well as any grants that are directly attached to the schema 315. The query engine 330 may determine that the inherited grant 320 has been persisted on the schema 315 and that the inherited grant 320 specifies that the select privilege should be granted for any table in the schema 315 to role 325. The query engine 330 may read the inherited grant 320 and create an implied grant virtually (i.e., in-memory). The implied grant is transient and only exists in-memory for the purpose of the authorization check. In this way, the inherited grant 320 is materialized when the role 325 utilizes the select privilege on table T3 (i.e., the table T3 is referenced). At block 525, using the implied grant, the query engine 330 may determine that the role 325 is authorized to utilize the select privilege on any table in the schema 315.

FIG. 6 illustrates a diagrammatic representation of a machine in the example form of a computer system 600 within which a set of instructions, for causing the machine to perform any one or more of the methodologies discussed herein for using inherited grants to grant privileges to objects in a container. More specifically, the machine may generate an inherited grant that specifies a permission on a first type of object in a container and a grant of the permission to a role. The inherited grant may be attached to the container, wherein the container includes a set of objects of the first type. In response to a first object of the set of objects being referenced via the role, a virtual implied grant may be created based on the inherited grant. Authorization of utilization of the permission on the first object is performed using the virtual implied grant, wherein the virtual implied grant is transient and exists in-memory only for the purpose of authorizing the utilization of the permission on the first object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute inherited grant instructions 625, for performing the operations and steps discussed herein.

The data storage device 618 may include a machine-readable storage medium 628, on which is stored one or more sets of inherited grant instructions 625 (e.g., software) embodying any one or more of the methodologies of functions described herein. The inherited grant instructions 625 may also reside, completely or at least partially, within the main memory 604 or within the processing device 602 during execution thereof by the computer system 600; the main memory 604 and the processing device 602 also constituting machine-readable storage media. The inherited grant instructions 625 may further be transmitted or received over a network 620 via the network interface device 608.

The machine-readable storage medium 628 may also be used to store instructions to perform a method for determining functions to compile, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:

a memory; and a processing device operatively coupled to the memory, the processing device to:

define a secure schema, wherein the secure schema is a schema that transfers ownership of an object created in the secure schema to a role that owns the secure schema;

generate a grant that specifies a permission on a first type of object in the secure schema and a grant of the permission to the role;

transfer, by the secure schema, ownership of an object of the first type that is created in the secure schema to the role;

in response to the object being referenced via the role, create a virtual implied grant based on the grant, wherein the virtual implied grant is a transient grant that only exists in-memory to authorize utilization of the permission on the object;

authorize utilization of the permission on the object using the virtual implied grant; and in response to the utilization of the permission on the object being authorized, deleting the virtual implied grant.

2. The system of claim 1, wherein access to the object by an original owner of the object is governed by permissions set by the role.

3. The system of claim 1, wherein the grant is an inherited grant.

4. The system of claim 3, wherein the processing device is further to:

attach the inherited grant to the secure schema; and in response to attaching the inherited grant to the secure schema, materialize the inherited grant in a metadata store associated with the secure schema.

5. The system of claim 4, wherein as of the time the inherited grant is attached to the secure schema, the processing device authorizes utilization of the permission on any objects of the first type within the secure schema using a virtual implied grant that corresponds to the object and is created based on the inherited grant.

6. The system of claim 4, wherein the processing device is further to:

remove the inherited grant from the secure schema, wherein as of the time the inherited grant is removed from the secure schema, the processing device no longer authorizes utilization of the permission on any objects within the secure schema using a virtual implied grant that corresponds to the object and is created based on the inherited grant.

7. The system of claim 4, wherein the processing device is further to:

define an access group within the secure schema, wherein the inherited grant is attached to the access group; and add one or more of a set of objects of the first type within the secure schema to the access group, wherein:

the processing device authorizes utilization of the permission on any of the one or more objects using a virtual implied grant that corresponds to the object and is created based on the inherited grant; and the processing device authorizes utilization of the permission on any of the set of objects not added to the access group is performed using a separate grant that is materialized in response to any of the set of objects not added to the access group being referenced.

8. The system of claim 4, wherein the processing device is further to:

define an access group within the secure schema, wherein the inherited grant is attached to the access group;

add one or more of a set of objects of the first type within the secure schema to the access group, wherein:

the processing device authorizes utilization of the permission on any of the one or more objects is performed using a separate grant that is materialized in response to any of the one or more objects being referenced; and the processing device authorizes utilization of the permission on any of the set of objects not added to the access group is performed using a virtual implied grant that corresponds to the object and is created based on the inherited grant.

9. The system of claim 1, wherein the first type of object is one of: a table, a view, a function, or a native application.

10. The system of claim 1, wherein the permission is one of: a select privilege, an insert privilege, or a modify privilege.

11. A method comprising:

defining a secure schema, wherein the secure schema is a schema that transfers ownership of an object created in the secure schema to a role that owns the secure schema;

generating a grant that specifies a permission on a first type of object in the secure schema and a grant of the permission to the role;

transferring, by the secure schema, ownership of an object of the first type that is created in the secure schema to the role;

in response to the object being referenced via the role, creating, by a processing device, a virtual implied grant based on the grant, wherein the virtual implied grant is a transient grant that only exists in-memory to authorize utilization of the permission on the object;

authorizing utilization of the permission on the object using the virtual implied grant; and in response to the utilization of the permission on the object being authorized, deleting the virtual implied grant.

12. The method of claim 11, wherein access to the object by an original owner of the object is governed by permissions set by the role.

13. The method of claim 11, wherein the grant is an inherited grant.

14. The method of claim 13, further comprising:

attaching the inherited grant to the secure schema; and in response to attaching the inherited grant to the secure schema, materializing the inherited grant in a metadata store associated with the secure schema.

15. The method of claim 14, wherein as of the time the inherited grant is attached to the secure schema, authorization to utilize the permission on any objects of the first type within the secure schema is performed using a virtual implied grant that corresponds to the object and is created based on the inherited grant.

16. The method of claim 14, further comprising:

removing the inherited grant from the secure schema, wherein as of the time the inherited grant is removed from the secure schema, authorization to utilize the permission on any objects within the secure schema is no longer performed using a virtual implied grant that corresponds to the object and is created based on the inherited grant.

17. The method of claim 14, further comprising:

defining an access group within the secure schema, wherein the inherited grant is attached to the access group; and adding one or more of a set of objects of the first type within the secure schema to the access group, wherein:

authorization to utilize the permission on any of the one or more objects is performed using a virtual implied grant that corresponds to the object and is created based on the inherited grant; and authorization to utilize the permission on any of the set of objects not added to the access group is performed using a separate grant that is materialized in response to any of the set of objects not added to the access group being referenced.

18. The method of claim 14, further comprising:

defining an access group within the secure schema, wherein the inherited grant is attached to the access group;

adding one or more of a set of objects of the first type within the secure schema to the access group, wherein:

authorization to utilize the permission on any of the one or more objects is performed using a separate grant that is materialized in response to any of the one or more objects being referenced; and authorization to utilize the permission on any of the set of objects not added to the access group is performed using a virtual implied grant that corresponds to the object and is created based on the inherited grant.

19. The method of claim 11, wherein the first type of object is one of: a table, a view, a function, or a native application.

20. The method of claim 11, wherein the permission is one of: a select privilege, an insert privilege, or a modify privilege.

21. A non-transitory computer-readable medium having instructions stored thereon which, when executed by the processing device, cause the processing device to:

define a secure schema, wherein the secure schema is a schema that transfers ownership of an object created in the secure schema to a role that owns the secure schema;

generate a grant that specifies a permission on a first type of object in the secure schema and a grant of the permission to the role;

transfer, by the secure schema, ownership of an object of the first type that is created in the secure schema to the role;

in response to the object being referenced via the role, create, by the processing device, a virtual implied grant based on the grant, wherein the virtual implied grant is a transient grant that only exists in-memory to authorize utilization of the permission on the object;

authorize utilization of the permission on the object using the virtual implied grant; and in response to the utilization of the permission on the object being authorized deleting the virtual implied grant.

22. The non-transitory computer-readable medium of claim 21, wherein access to the object by an original owner of the object is governed by permissions set by the role.

23. The non-transitory computer-readable medium of claim 21, wherein the grant is an inherited grant.

24. The non-transitory computer-readable medium of claim 23, wherein the processing device is further to:

attach the inherited grant to the secure schema; and in response to attaching the inherited grant to the secure schema, materialize the inherited grant in a metadata store associated with the secure schema.

25. The non-transitory computer-readable medium of claim 24, wherein as of the time the inherited grant is attached to the secure schema, the processing device authorizes utilization of the permission on any objects of the first type within the secure schema using a virtual implied grant that corresponds to the object and is created based on the inherited grant.

26. The non-transitory computer-readable medium of claim 24, wherein the processing device is further to:

remove the inherited grant from the secure schema, wherein as of the time the inherited grant is removed from the secure schema, the processing device no longer authorizes utilization of the permission on any objects within the secure schema using a virtual implied grant that corresponds to the object and is created based on the inherited grant.

27. The non-transitory computer-readable medium of claim 24, wherein the processing device is further to:

define an access group within the secure schema, wherein the inherited grant is attached to the access group; and add one or more of a set of objects of the first type within the secure schema to the access group, wherein:

the processing device authorizes utilization of the permission on any of the one or more objects using a virtual implied grant that corresponds to the object and is created based on the inherited grant; and the processing device authorizes utilization of the permission on any of the set of objects not added to the access group is performed using a separate grant that is materialized in response to any of the set of objects not added to the access group being referenced.

28. The non-transitory computer-readable medium of claim 24, wherein the processing device is further to:

define an access group within the secure schema, wherein the inherited grant is attached to the access group;

add one or more of a set of objects of the first type within the secure schema to the access group, wherein:

the processing device authorizes utilization of the permission on any of the one or more objects is performed using a separate grant that is materialized in response to any of the one or more objects being referenced; and the processing device authorizes utilization of the permission on any of the set of objects not added to the access group is performed using a virtual implied grant that corresponds to the object and is created based on the inherited grant.

29. The non-transitory computer-readable medium of claim 21, wherein the first type of object is one of: a table, a view, a function, or a native application.

30. The non-transitory computer-readable medium of claim 21, wherein the permission is one of: a select privilege, an insert privilege, or a modify privilege.

* * * * *